United States Patent
Park et al.

(10) Patent No.: US 10,044,708 B2
(45) Date of Patent: Aug. 7, 2018

(54) METHOD AND APPARATUS FOR CONTROLLING AUTHENTICATION STATE OF ELECTRONIC DEVICE

(71) Applicant: Samsung Electronics Co., Ltd., Gyeonggi-do (KR)

(72) Inventors: Suyoung Park, Gyeonggi-do (KR); Suha Yoon, Seoul (KR); Euichang Jung, Seoul (KR); Jingil Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 14/678,877

(22) Filed: Apr. 3, 2015

(65) Prior Publication Data

US 2015/0288681 A1    Oct. 8, 2015

(30) Foreign Application Priority Data

Apr. 4, 2014    (KR) ........................ 10-2014-0040681

(51) Int. Cl.
*H04L 29/06*    (2006.01)
*H04W 12/06*    (2009.01)

(52) U.S. Cl.
CPC ......... *H04L 63/0846* (2013.01); *H04W 12/06* (2013.01); *H04L 63/0861* (2013.01)

(58) Field of Classification Search
None
See application file for complete search history.

(56) References Cited

U.S. PATENT DOCUMENTS 7,375,615 B2    5/2008    Kitagawa et al.
7,991,388 B1 *   8/2011    Becker ................... G06Q 20/32
                                                 455/410

(Continued)

FOREIGN PATENT DOCUMENTS

JP    2005-352710    12/2005
JP    2010-249889    11/2010

OTHER PUBLICATIONS

Gu, Lili; Gregory, Mark A. A Green and Secure Authentication for the 4th Generation Mobile Network. 2011 Australasian Telecommunication Networks and Applications Conference (ATNAC). Pub. Date: 2011. http://ieeexplore.ieee.org/stamp/stamp.jsp?tp=& arnumber=6096633.*

(Continued)

*Primary Examiner* — Jeremiah Avery

(57) ABSTRACT

A method for controlling an authentication state of an electronic device according to various embodiments of the present disclosure includes authenticating user login with representative authentication information in a first application requiring user authentication, identifying temporary authentication information when authenticating the user in the first application, storing the identified temporary authentication information and the representative authentication information, deciding whether temporary authentication information is identical to the stored temporary authentication information by identifying the temporary authentication information while using the first application, and maintaining the authentication state if the temporary authentication is identical to the stored temporary authentication information.

20 Claims, 10 Drawing Sheets

(56) References Cited

U.S. PATENT DOCUMENTS

| | | | | |
|---|---|---|---|---|
| 8,970,348 | B1* | 3/2015 | Evans | G06K 9/00 340/5.52 |
| 9,119,539 | B1* | 9/2015 | Dotan | A61B 5/02438 |
| 2005/0187883 | A1* | 8/2005 | Bishop | G06Q 20/027 705/67 |
| 2006/0288234 | A1* | 12/2006 | Azar | G06F 21/32 713/186 |
| 2009/0076966 | A1* | 3/2009 | Bishop | G06Q 20/027 705/67 |
| 2010/0115114 | A1* | 5/2010 | Headley | G06F 21/32 709/229 |
| 2010/0322487 | A1 | 12/2010 | Geosimonian | |
| 2011/0007901 | A1* | 1/2011 | Ikeda | H04B 5/02 380/270 |
| 2013/0167212 | A1* | 6/2013 | Azar | G06F 21/32 726/7 |
| 2013/0263227 | A1* | 10/2013 | Gongaware | H04L 63/08 726/4 |
| 2014/0310764 | A1* | 10/2014 | Tippett | G06F 21/31 726/1 |
| 2014/0359722 | A1* | 12/2014 | Schultz | H04L 63/0861 726/5 |
| 2015/0049922 | A1* | 2/2015 | Miller | G06K 9/00255 382/118 |
| 2015/0089607 | A1* | 3/2015 | Hubner | H04L 63/0838 726/6 |
| 2015/0264567 | A1* | 9/2015 | Sensharma | H04W 12/06 455/411 |
| 2016/0021238 | A1* | 1/2016 | Abramson | H04W 48/04 455/418 |
| 2016/0219046 | A1* | 7/2016 | Ballard | H04L 63/0861 |

OTHER PUBLICATIONS

Torres, Jenny; Nogueira, Michele; Pujolle, Guy. Secure and Revocable Node Authentication in Vehicular Ad-Hoc Networks. 2013 IEEE Symposium on Computers and Communications (ISCC). Pub. Date: 2013. http://ieeexplore.ieee.org/stamp/stamp.jsp?tp=&arnumber=6754962.*

* cited by examiner

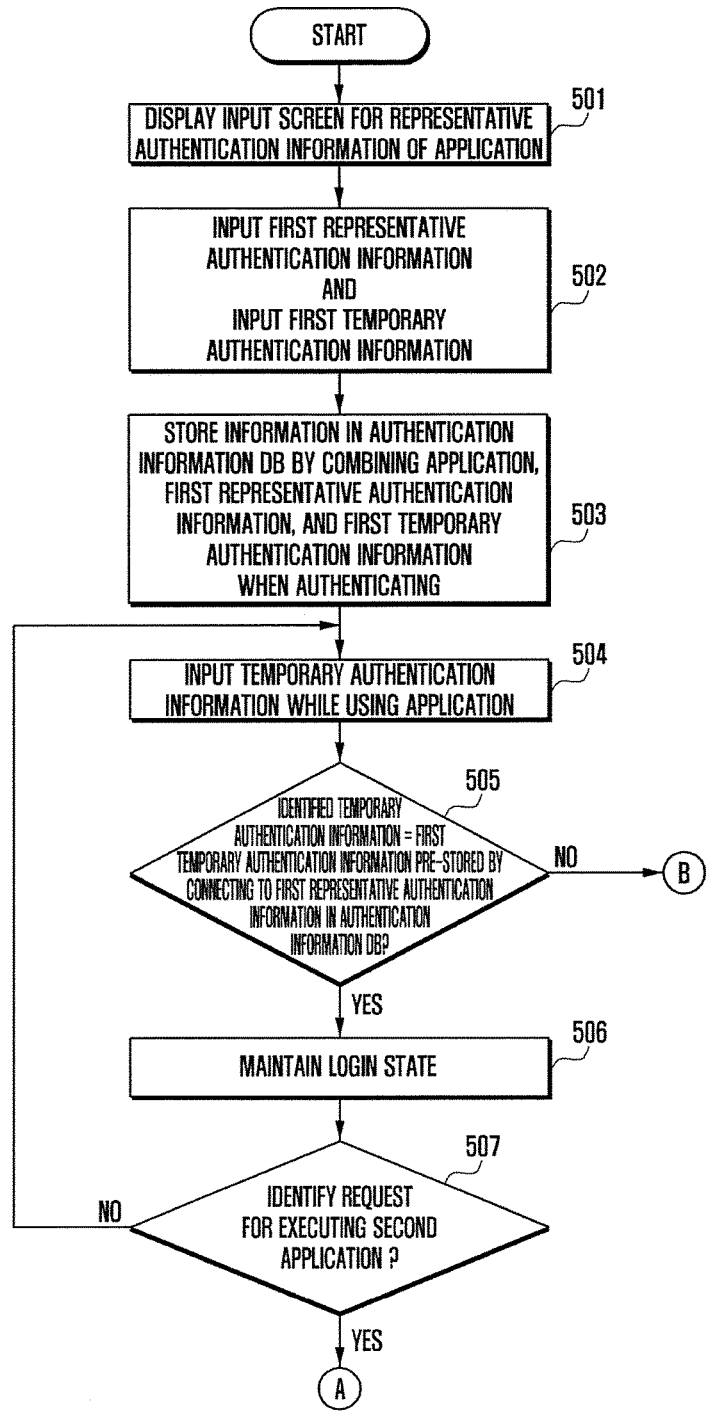

METHOD AND APPARATUS FOR CONTROLLING AUTHENTICATION STATE OF ELECTRONIC DEVICE

CROSS-REFERENCE TO RELATED APPLICATIONS AND CLAIM OF PRIORITY

The present application is related to and claims priority from and the benefit under 35 U.S.C. § 119(a) of Korean Patent Application No. 10-2014-0040681, filed on Apr. 4, 2014, which is hereby incorporated by reference for all purposes as if fully set forth herein.

TECHNICAL FIELD

The present disclosure relates to a method and an apparatus for controlling an authentication state of an electronic device.

BACKGROUND

As the number of applications requiring user authentication increases, the number of inputting user account authentication increases. For the purpose of reducing the number of inputting account information, a method for storing the account information in an electronic device or server and automatically authenticating user login has been used. However, a danger in security such as a leak of information exists, because the user authentication can be automatically performed if a person other than the user utilizes the stored account authentication information.

SUMMARY

To address the above-discussed deficiencies, it is a primary object to provide a method and an apparatus for controlling an authentication state of an electronic device which can improve conveniences by reducing the number of inputs for user account information and improve securities by performing an additional authentication procedure.

In accordance with embodiments of the present disclosure, a method for controlling an authentication state of an electronic device includes authenticating user login with representative authentication information in a first application requiring user authentication, identifying temporary authentication information when authenticating the user in the first application, storing the identified temporary authentication information and the representative authentication information, deciding whether temporary authentication information is identical to the stored temporary authentication information by identifying the temporary authentication information while using the first application, and maintaining an authentication state if the temporary authentication is identical to the stored temporary authentication information In accordance with embodiments of the present disclosure, an apparatus for controlling an authentication state of an electronic device includes a display unit configured to display a screen requesting user authentication for a first application; a sensor unit, camera, and wireless communication unit configured to identify temporary authentication information and representative authentication information; a memory configured to store information including at least one of the temporary authentication information and the first application, and an authentication information DB for storing information required to connect the representative authentication information; and a controller configured to authenticate user login with representative authentication information in a first application requiring user authentication, to identify temporary authentication information when authenticating the user in the first application, to store the identified temporary authentication information and the representative authentication information, to decide whether temporary authentication information is identical to the stored temporary authentication information by identifying the temporary authentication information while using the first application, and to maintain an authentication state if the temporary authentication is identical to the stored temporary authentication information.

The method and apparatus for controlling an authentication state of an electronic device according to various embodiments of the present disclosure can improve both the security and usability by performing user authentication through representative authentication information and additionally identifying temporary authentication information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate exemplary processes of controlling an authentication state according to various embodiments of the present disclosure;

Figure 1A:
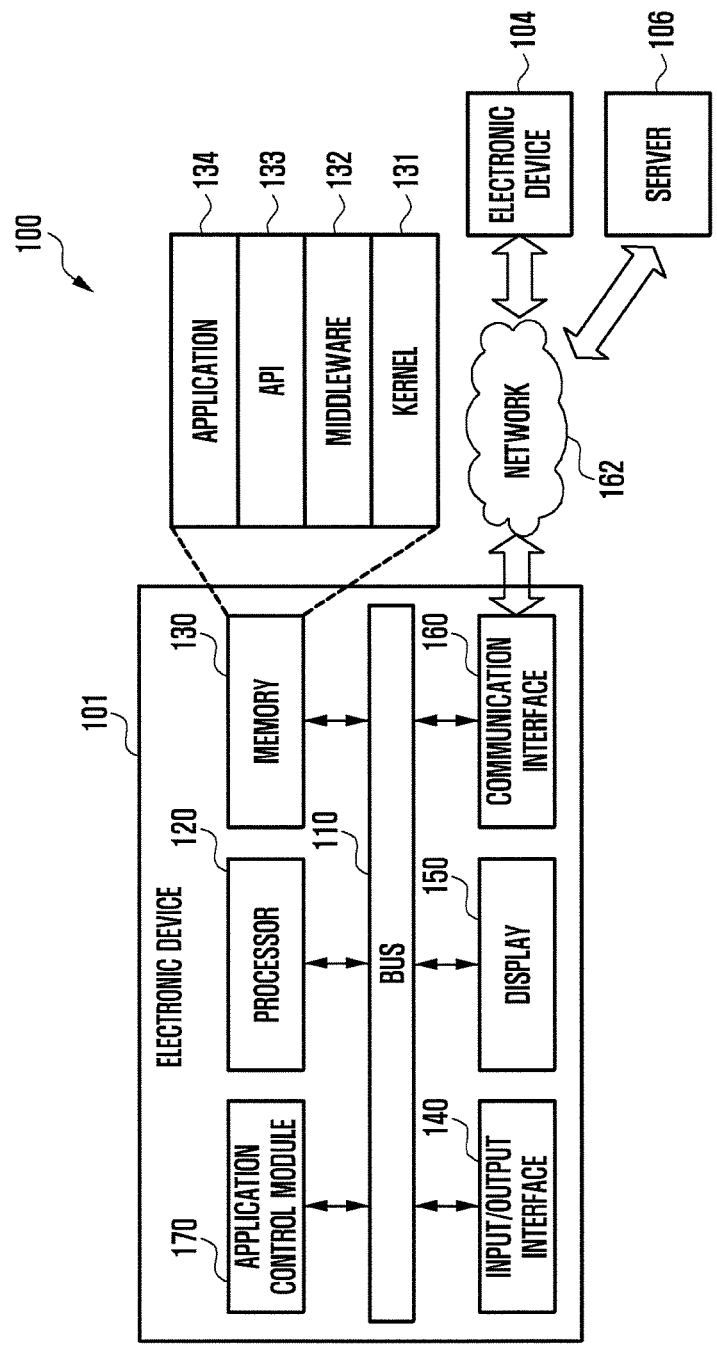
FIGS. 1A and 1B illustrate a network environment including an electronic device according to various embodiments of the present disclosure.

Table 1 illustrates a data list of authentication information DB according to various embodiments of the present disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, embodiments of the present disclosure will be described in detail with reference to the accompanying drawings. It will be easily appreciated to those skilled in the art that various modifications, additions and substitutions are possible from the embodiment of the present disclosure, and the scope of the disclosure should not be limited to the following embodiments. The embodiments of the present disclosure are provided such that those skilled in the art completely understand the disclosure. In the drawings, the same or similar elements are denoted by the same reference numerals even though they are depicted in different drawings.

The expressions such as "include" and "may include" which can be used in the present disclosure denote the presence of the disclosed functions, operations, and constituent elements and do not limit one or more additional functions, operations, and constituent elements. In the present disclosure, the terms such as "include" or "have" can be construed to denote a certain characteristic, number, step, operation, constituent element, component or a combination thereof, but cannot be construed to exclude the existence of or a possibility of the addition of one or more other characteristics, numbers, steps, operations, constituent elements, components or combinations thereof.

In the present disclosure, the expression "or" includes any and all combinations of the associated listed words. For example, the expression "A or B" can include A, can include B, or can include both A and B.

In the present disclosure, expressions including ordinal numbers, such as "first" and "second," etc., or the like, can modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

When a component is referred to as being "connected" or "accessed" to other component, it should be understood that not only the component is directly connected or accessed to the other component, but also another component can exist between the component and the other component. When a component is referred to as being "directly connected" or "directly accessed" to other component, it should be understood that there is no component between.

The terms used in the present disclosure are only used to describe specific various embodiments, and are not intended to limit the present disclosure. Singular forms are intended to include plural forms unless the context clearly indicates otherwise.

Unless otherwise defined, all terms including technical or scientific terms used herein have the same meaning as commonly understood by one of ordinary skill in the art to which the disclosure pertains. In addition, unless otherwise defined, all terms defined in generally used dictionaries are not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (such as an MP3 player), a mobile medical device, a camera, or a wearable device. Examples of the wearable device are a head-mounted-device (HMD) (such as electronic eyeglasses), electronic clothing, an electronic bracelet, an electronic necklace, an appcessory, an electronic tattoo, a smart watch, etc.

The electronic device according to the embodiments of the present disclosure can be smart home appliances. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (such as SAMSUNG HOME SYNC® box, APPLE TV® box, or GOOGLE TV® box), a game console, an electronic dictionary, an electronic key, a camcorder, an electronic album, or the like.

The electronic device according to the embodiments of the present disclosure can include at least one of the following: medical devices (such as Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (such as navigation equipment, gyrocompass, etc.), avionics, a security device, a head unit for vehicles, an industrial or home robot, an automatic teller's machine (ATM), a point of sales (POS) system, etc.

The electronic device according to the embodiments of the present disclosure can include at least one of the following: furniture or a portion of a building or structure, an electronic board, an electronic signature receiving device, a projector, various measuring instruments (such as a water meter, an electric meter, a gas meter and a wave meter), etc. respectively. The electronic device, according to the embodiments of the present disclosure, also includes a combination of the devices listed above. The electronic device, according to the embodiments of the present disclosure, is a flexible device. It is obvious to those skilled in the art that the electronic device according to the embodiments of the present disclosure is not limited to the aforementioned devices.

Hereinafter, electronic devices according the embodiments of the present disclosure are described in detail with reference to the accompanying drawings. In the description, the term a 'user' refers to as a person or a device that uses an electronic device, such as an artificial intelligent electronic device.

FIG. 1 illustrates a network environment 100 including an electronic device 101 according to certain embodiments of the present disclosure.

Referring to FIG. 1, the electronic device 101 includes a bus 110, a processor 120, a memory 130, an input/output (I/O) interface 140, a display 150, a communication interface 160 and an application control module 170.

The bus 110 is a communication circuit that connects the components to each other and transfers data (such as control messages) between the components.

The processor 120 receives instructions from the components (such as the memory 130, I/O interface 140, display 150, communication interface 160, application control module 170, etc.) via the bus 110, decodes them, and performs corresponding operations or data processing according to the decoded instructions.

The memory 130 stores instructions or data transferred from or created in the processor 120 or the other components (such as the I/O interface 140, display 150, communication interface 160, application control module 170, etc.). The memory 130 includes programming modules, such as a kernel 131, middleware 132, application programming interface (API) 133, application module 134, etc. Each of the programming modules is software, firmware, hardware or a combination thereof.

The kernel 131 controls or manages system resources (such as the bus 110, processor 120, memory 130, etc.) used to execute operations or functions of the programming modules, such as the middleware 132, API 133, and application module 134. The kernel 131 also provides an interface that can access and control or manage the components of the electronic device 101 via the middleware 132, API 133, and application module 134.

The middleware 132 makes it possible for the API 133 or application module 134 to perform data communication with the kernel 131. The middleware 132 also performs control operations (such as scheduling, load balancing) for task requests transmitted from the application module 134 by methods. For example, a method for assigning the order of priority to use the system resources (such as the bus 110, processor 120, memory 130, etc.) of the electronic device 101 to at least one of the applications of the application module 134.

The application programming interface (API) 133 is an interface that allows the application module 134 to control functions of the kernel 131 or middleware 132. For example, the API 133 includes at least one interface or function (such as an instruction) for file control, window control, character control, video process, etc.

In embodiments of the present disclosure, the application module 134 includes applications that are related to: SMS or MMS, email, calendar, alarm, health care (such as an application for measuring the blood sugar level, a workout application, etc.), environment information (such as atmospheric pressure, humidity, temperature, etc.), and so on. The application module 134 is an application related to exchanging information between the electronic device 101 and the external electronic devices (such as an electronic device 104). The information exchange-related application includes a notification relay application for transmitting specific information to an external electronic device or a device management application for managing external electronic devices.

For example, the notification relay application includes a function for transmitting notification information, created by the other applications of the electronic device 101 (such as SMS or MMS application, email application, health care application, environment information application, etc.), to an external electronic device (such as electronic device 104).

The notification relay application receives notification information from an external electronic device (such as electronic device 104) and provides it to the user. The device management application can manage (such as to install, delete, or update): part of the functions of an external electronic device (such as electronic device 104) communicating with the electronic device 101, such as turning on or off the external electronic device, turning on or off part of the components of the external electronic device, adjusting the brightness (or the display resolution) of the display of the external electronic device, etc.; applications operated in the external electronic device; or services from the external electronic device, such as call service or messaging service, etc.

In embodiments of the present disclosure, the application module 134 includes applications designated according to attributes (such as type of electronic device) of the external electronic device (such as electronic device 104). For example, when the external electronic device is an MP3 player, the application module 134 includes an application related to music playback. When the external electronic device is a mobile medical device, the application module 134 includes an application related to health care. In certain embodiments of the present disclosure, the application module 134 includes at least one of the following: an application designated in the electronic device 101 and applications transmitted from external electronic devices (such as server 106, electronic device 104, etc.).

The input/output interface 140 receives instructions or data from the user via an input or output system (such as a sensor, keyboard or touch screen) and transfers them to the processor 120, memory 130, communication interface 160 or application control module 170 through the bus 110. For example, the input/output interface 140 provides data corresponding to a user's touch input to a touch screen to the processor 120. The input/output interface 140 receives instructions or data from the processor 120, memory 130, communication interface 160 or application control module 170 through the bus 110, and outputs them to an input or output system (such as a speaker or a display). For example, the input/output interface 140 outputs voice data processed by the processor 120 to the speaker.

The display 150 displays information (such as multimedia data, text data, etc.) on the screen so that the user can view it.

The communication interface 160 communicates between the electronic device 101 and an external system (such as an electronic device 104 or server 106). For example, the communication interface 160 connects to a network 162 in wireless or wired mode and communicates with the external system. Wireless communication includes at least one of the following: Wireless Fidelity (Wi-Fi), Bluetooth (BT), near field communication (NFC), global positioning system (GPS) or cellular communication (such as LTE, LTE-A, CDMA, WCDMA, UMTS, Wi-Bro, GSM, etc.). Wired communication includes at least one of the following: universal serial bus (USB), high definition multimedia interface (HDMI), recommended standard 232 (RS-232), plain old telephone service (POTS), etc.

In certain embodiments of the present disclosure, the network 162 is a telecommunication network. The telecommunication network includes at least one of the following: a computer network, Internet, Internet of things, telephone network, etc. The protocol for communication between the electronic device 101 and the external system, such as transport layer protocol, data link layer protocol, or physical layer protocol, is supported by at least one of the following:

application module 134, API 133, middleware 132, kernel 131 and communication module 160.

The application control module 170 processes at least a part of the information acquired from other components (such as processor 120, memory 130, input/output interface 140, and communication interface 160) and provides the user with the processing result in various ways. For example, the application control module 170 controls a part of the functions of the electronic device 101 in order for the electronic device 101 to interoperate with other electronic device (such as electronic device 104 and server 106). According to certain embodiments, at least a part of the application control module 170 is included in the server 106 such that at least one of the operations of the application control module 170 are supported by the server 106.

Hereafter, additional information for the application control module 170 is provided referring to the accompanying FIGS. 2-9.

Before providing the additional information of the application control module, an example of relation between an electronic device and a server according to various embodiments of the present disclosure is described. When the server is an email server, the electronic device transmits account and representative authentication information to the email server through a network by controlling a communication interface. The electronic device transmits account information or representative authentication information related to an account in order to get user authentication for an application, which can display a received email. The email server identifies whether the received account or representative authentication information is identical to account or corresponding information pre-stored in a server DB by comparing them. When the information is identical, the email server transmits an approval message for the user authentication to the electronic device. After receiving the approval message for the user authentication, the electronic device controls a display unit to display a page so that a user can identify related information such as an incoming email or outgoing email. Various kinds of information are transmitted according to the characteristics of the server. As another example, when the server is an appstore server, information related to an application list or application installation message is transmitted.

Figure 2:
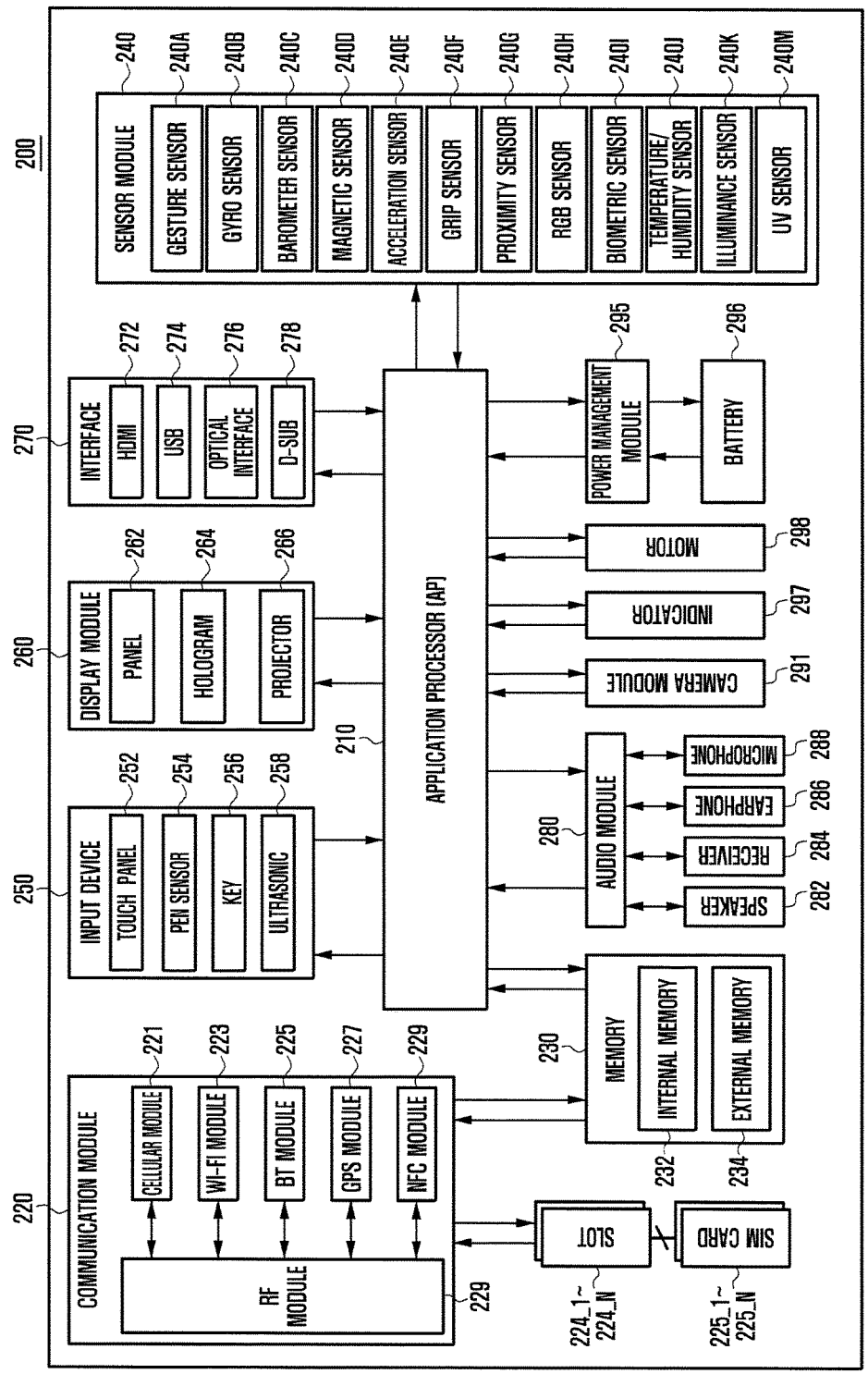
FIG. 2 illustrates a configuration of electronic device according to various embodiments of the present disclosure.

FIG. 2 illustrates a configuration of the electronic device according to various embodiments of the present disclosure. The electronic device 201 can be of the whole or a part of the electronic device 101.

Referring to FIG. 2, the electronic device 201 includes an Application Processor (AP) 210, a communication module 220, a Subscriber Identity Module (SIM) card 225, a memory 230, a sensor module 240, an input device 250, a display 260, an interface 270, an audio module 280, a camera module 291, a power management module 295, a battery 296, an indicator 297, and a motor 298. The AP 210 operates an Operating System (OS) or application programs to control a plurality of hardware or software components connected to the AP 210 and perform data-processing and operations on multimedia data. For example, the AP 210 is implemented in the form of System on Chip (SoC). According to certain embodiments, the AP 210 includes a Graphic Processing Unit (GPU) (not illustrated).

The communication module 220 (such as communication interface 160) performs data communication with other electronic devices (such as electronic device 104 and server 106) through a network. According to certain embodiments, the communication module 220 includes a cellular module 221, a Wi-Fi module 223, a BT module 226, a GPS module 227, an NFC module 228, and a Radio Frequency (RF) module 229.

The cellular module 221 is responsible for voice and video communication, text messaging, and Internet access services through a communication network (such as LTE, LTE-A, CDMA, WCDMA, UMTS, WiBro, and GSM networks). The cellular module 221 performs identification and authentication of electronic devices in the communication network using the SIM card 225. According to certain embodiments, the cellular module 221 performs at least one of the functions of the AP 210. For example, the cellular module 221 performs at least a part of the multimedia control function.

According to certain embodiments, the cellular module 221 includes a Communication Processor (CP). The cellular module 221 is implemented in the form of SOC. Although the cellular module 221 (such as communication processor), the memory 230, and the power management module 295 are depicted as independent components separated from the AP 210, the present disclosure is not limited thereto but can be embodied in a way that the AP includes at least one of the components (such as cellular module 221).

According to certain embodiments, each of the AP 210 and the cellular module 221 (such as communication processor) loads a command or data received from at least one of the components on a non-volatile or volatile memory and processes the command or data. The AP 210 or the cellular module 221 stores the data received from other components or generated by at least one of other components in the non-volatile memory.

Each of the Wi-Fi module 223, the BT module 226, the GPS module 227, and the NFC module 228 includes a processor for processing the data it transmits or receives. Although the cellular module 221, the Wi-Fi module 223, the BT module 226, the GPS module 227, and the NFC module 228 are depicted as independent blocks, at least two of them (such as communication processor corresponding to the cellular module 221 and Wi-Fi processor corresponding to the Wi-Fi module 223) are integrated in the form of SoC.

The RF module 229 is responsible for data communication, such as transmitting or receiving RF signals. Although not depicted, the RF module 229 includes a transceiver, a Power Amp Module (PAM), a frequency filter, and a Low Noise Amplifier (LNA). The RF module 229 also includes the elements for transmitting or receiving electric wave in free space, such as a conductor or conductive wire. Although FIG. 2 illustrates the Wi-Fi module 223, the BT module 226, the GPS module 227, and the NFC module 228 are sharing the RF module 229, the present disclosure is not limited thereto but can be embodied in a way that at least one of the Wi-Fi module 223, the BT module 227, and the NFC module 228 transmits or receives RF signals using an independent RF module.

The SIM card 225 can be designed so as to be inserted into a slot 224 formed at a predetermined position of the electronic device. The SIM card 225 can store unique identity information (such as Integrated Circuit Card Identifier (IC-CID)) or subscriber information (such as International Mobile Subscriber Identity (IMSI)).

The memory 230 (such as memory 130) includes at least one of the internal memory 232 and an external memory 234. The internal memory 232 includes at least one of a volatile memory (such as Dynamic Random Access Memory (DRAM), Static RAM (SRAM), Synchronous Dynamic RAM (SDRAM) or a non-volatile memory (such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to certain embodiments, the internal memory 232 is a Solid State Drive (SSD). The external memory 234 is a flash drive such as Compact Flash (CF), Secure Digital (SD), micro-SD, Mini-SD, extreme Digital (xD), and Memory Stick. The external memory 234 can be connected to the electronic device 201 through various interfaces functionally. According to certain embodiments, the electronic device 201 includes a storage device (or storage medium) such as hard drive.

The sensor module 240 measures physical quantity or check the operation status of the electronic device 201 and convert the measured or checked information to an electric signal. The sensor module 240 includes at least one of gesture sensor 240A, Gyro sensor 240B, barometric sensor 240C, magnetic sensor 240D, acceleration sensor 240E, grip sensor 240F, proximity sensor 240G, color sensor 240H (such as Red, Green, Blue (RGB) sensor), bio sensor 240I, temperature/humidity sensor 240J, illuminance sensor 240K, and Ultra Violet (UV) sensor 240M. In certain embodiments, the sensor module 240 includes E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 further includes a control circuit for controlling at least one of the sensors included therein.

The input device 250 includes a touch panel 252, a (digital) pen sensor 254, keys 256, and an ultrasonic input device 258. The touch panel 252 is one of capacitive, resistive, infrared, microwave type touch panel. The touch panel 252 includes a control circuit. When the input device 250 is a capacitive type touch panel, it is possible to detect physical contact or approximation. The touch panel 252 further includes a tactile layer. In this case, the touch panel 252 provides the user with haptic reaction.

The (digital) pen sensor 254 is implemented with a sheet with the same or similar way as touch input of the user or a separate recognition sheet. The keys 256 include physical buttons, optical key, and keypad. The ultrasonic input device 258 is a device capable of checking data by detecting sound wave through a microphone 288 and be implemented for wireless recognition. According to certain embodiments, the electronic device 201 receives the user input made by means of an external device (such as a computer or server) connected through the communication module 220.

The display 260 (such as a display module 150) includes a panel 262, a hologram device 264, and a projector 266. The panel 262 can be a Liquid Crystal Display (LCD) panel or an Active Matrix Organic Light Emitting Diodes (AMO-LED) panel. The panel 262 can be implemented to be flexible, transparent, or wearable. The panel 262 can be implemented as a module integrated with the touch panel 252. The hologram device 264 presents a 3-dimensional image in the air using interference of light. The projector 266 projects an image to a screen. The screen can be placed inside or outside the electronic device. According to certain embodiments, the display 260 includes a control circuit for controlling the panel 262, the hologram device 264, and the projector 266.

The interface 270 includes a High-Definition Multimedia Interface (HDMI) 272, a Universal Serial Bus (USB) 274, an optical interface 276, and a D-subminiature (D-sub) 278.

The interface 270 includes the communication interface 160 as illustrated in FIG. 1. In certain embodiments, the interface 270 includes a Mobile High-definition Link (MHL) interface, a SD/MMC card interface, and infrared Data Association (irDA) standard interface.

The audio module 280 converts sound to electric signal and vice versa. At least a part of the audio module 280 is included in the input/output interface 140 as shown in FIG. 1. The audio module 280 process the audio information input or output through the speaker 282, the receiver 284, the earphone 286, and the microphone 288.

The camera module 291 is a device capable of taking still and motion pictures and, according to certain embodiments, includes at least one image sensor (such as front and rear sensors), a lens (not illustrated), and Image Signal Processor (ISP) (not illustrated), and a flash (such as LED or xenon lamp) (not illustrated).

The power management module 295 manages the power of the electronic device 201. Although not illustrated, the power management module 295 includes a Power Management Integrated Circuit (PMIC), a charger Integrated Circuit (IC), a battery, and a battery or fuel gauge.

The PMIC be integrated into an integrated circuit or SoC semiconductor. The charging be classified into wireless charging and wired charge. The charger IC charges the battery and protects the charger against overvoltage or overcurrent. According to certain embodiments, the charger IC includes at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge measures the residual power of the battery 296, charging voltage, current, and temperature. The battery 296 stores or generates power and supply the stored or generated power to the electronic device 201. The battery 296 includes a rechargeable battery or a solar battery.

The indicator 297 displays operation status of the electronic device 201 or a part of the electronic device, booting status, messaging status, and charging status. The motor 298 converts the electronic signal to mechanical vibration. Although not illustrated, the electronic device 201 includes a processing unit (such as GPU) for supporting mobile TV. The processing unit for supporting the mobile TV is able to processes the media data abiding by the broadcast standards such Digital Multimedia Broadcasting (DMB), Digital Video Broadcasting (DVB), and media flow. The above enumerated components of the electronic device of the present disclosure can be implemented into one or more parts, and the names of the corresponding components can be changed depending on the kind of the electronic device. The electronic device of the present disclosure can include at least one of the aforementioned components with omission or addition of some components. The components of the electronic device of the present disclosure can be combined selectively into an entity to perform the functions of the components equally as before the combination. The term "module" according to the embodiments of the disclosure, means, but is not limited to, a unit of one of software, hardware, and firmware or any combination thereof. The term "module" can be used interchangeably with the terms "unit," "logic," "logical block," "component," or "circuit." The term "module" can denote a smallest unit of component or a part thereof. The term "module" can be the smallest unit of performing at least one function or a part thereof. A module can be implemented mechanically or electronically.

For example, a module can include at least one of Application-Specific Integrated Circuit (ASIC) chip, Field-Programmable Gate Arrays (FPGAs), and Programmable-Logic Device known or to be developed for certain operations.

Figure 3:
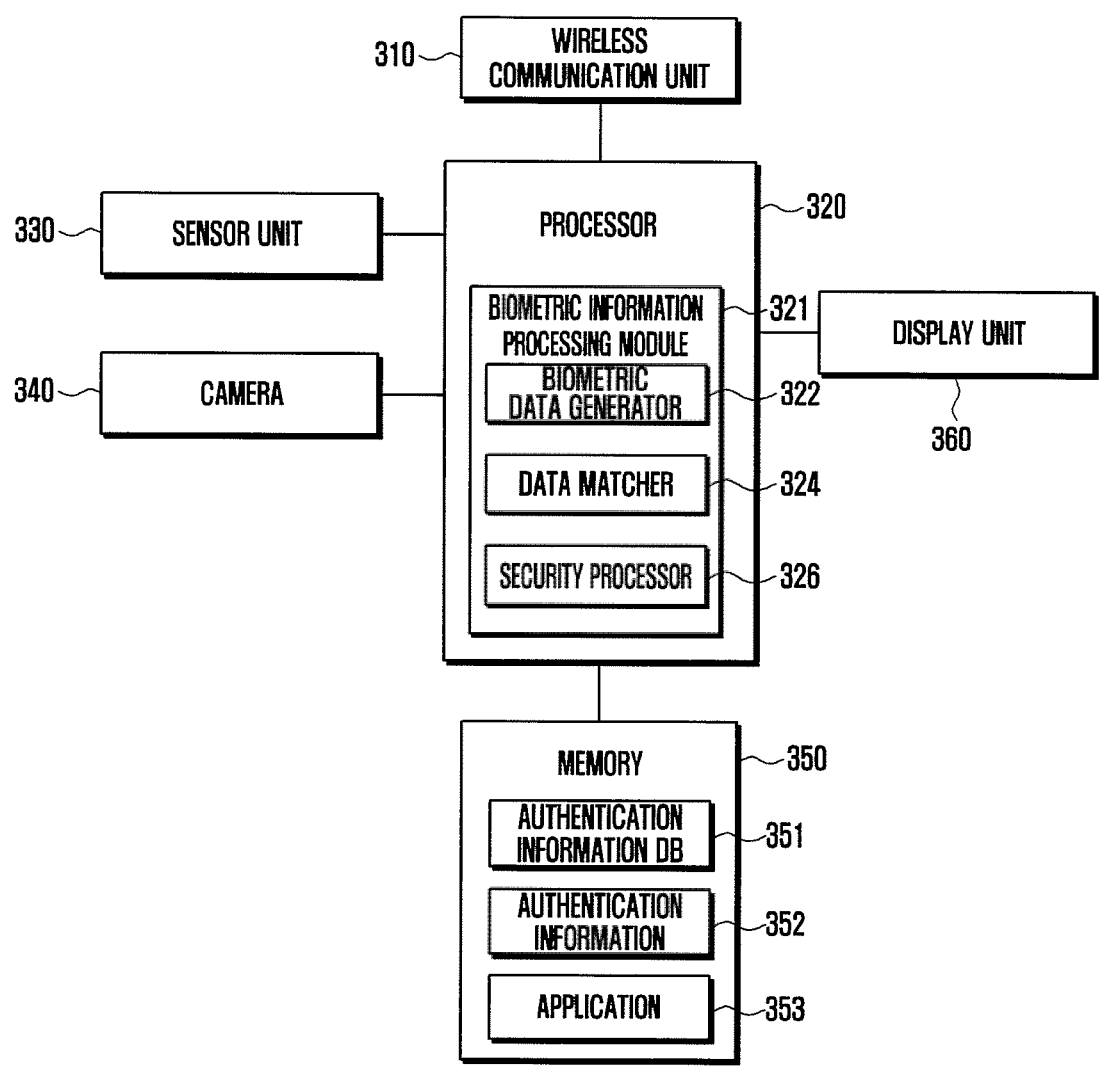
FIG. 3 illustrates a configuration of electronic device according to various embodiments of the present disclosure.

FIG. 3 illustrates a configuration of electronic device according to various embodiments of the present disclosure.

Referring to FIG. 3, an electronic device 300 (such as the electronic device 101 of FIG. 1A and the electronic device 200 of FIG. 2) includes a wireless communication unit 310 (such as the communication module 220), processor 320 (such as the application control module 170), sensor unit 330 (such as the sensor module 240), camera 340 (such as the camera module 291), memory 350 (such as the memory 230), and display unit 360 (such as the display module 260).

The processor 320 includes a biometric information processing module 321. The biometric information processing module 321 is included in the secure area 137 of FIG. 1B. The biometric information processing module 321 of the secure area 137 is configured with a biometric data generator 322, data matcher 324, and security processor 326.

Figure 1B:
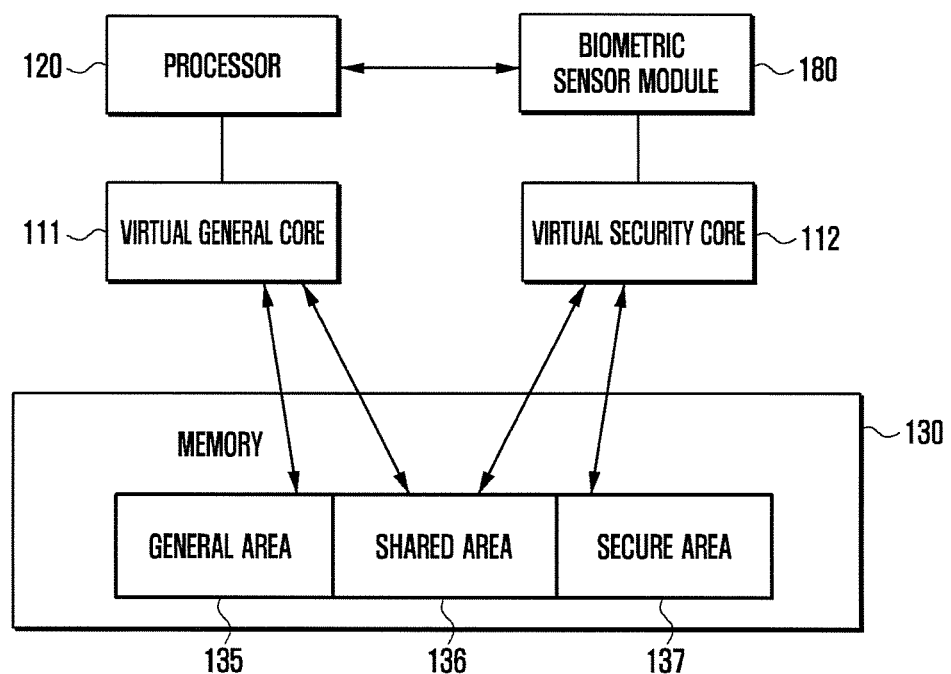

The biometric data generator 322 calculates inherent characteristic information of identified object based on data obtained by a biometric sensor module (180 of FIG. 1B). The biometric data generator 322 generates biometric information by converting the calculated inherent characteristic information to a biometric template. The biometric template is provided by encoding biometric image information obtained by a sensor. According to certain embodiments of the present disclosure, the biometric data generator 322 obtains a biometric image such as a fingerprint image, iris image, and face image. For example, the biometric image is obtained by an optical method using reflection of light or non-optical method using a pressure, heat, and ultrasonic waves. The biometric data generator 322 extracts inherent characteristic information based on a biometric image of a person. For example, the characteristic information for identifying a fingerprint can be minutiae, such as a ridge end, bifurcation point, core point, and delta point of a line. The biometric data generator 322 can be calculated in a format or frame predetermined for identifying a matching degree with stored biometric registration data. For example, the information of the predetermined format can be provided in a template form.

The biometric data generator 322 stores the generated biometric data in a memory as registration information if registration of the biometric information is requested. In certain embodiments, the request for registration of biometric information is received through a security signal transmitted from the general area.

The data matcher 324 identify whether biometric authentication data input for biometric identification matches stored biometric registration data if the biometric identification is requested. In certain embodiments, the request for biometric identification is received through a security signal transmitted from the general area.

According to various embodiments of the present disclosure, the data matcher 324 compares specific information calculated from biometric authentication data input for biometric identification with at least one of registered data and calculate a matching value. The matching value is a value indicating matching information between the biometric authentication data and biometric registration data. For example, the matching value is calculated as the number of characteristic points identified to be corresponding or identical to each other from the characteristic points included in biometric data while matching data. In certain embodiments, the matching value is calculated according to statistical data or probability functions by considering the similarities of distances, directions, or disposition forms between characteristic points included in the biometric data. The data matcher 324 identifies success in biometric authentication based on a matching value of specific information. For example, the data matcher 324 decides that the biometric authentication succeeds when the matching value is greater than a predetermined value and decides that the biometric authentication failed when the matching value is less than the predetermined value. The data matcher 324 controls the biometric authentication, so that result information relates to the success in authentication (for example, a true or false signal) for a biometric identification function module in the general area. The security processor 326 encrypts and decrypts the biometric data. The security processor 326 generates a unique key based on specific identification information of a device. For example, the unique key is an accessible value in a security mode. According to certain embodiments of the present disclosure, the security processor 326 encrypts the biometric data and stores the encrypted biometric data in the secure area 137 of the memory 350 by using a unique key while registering biometric information. The security processor 326 obtains the encrypted biometric data from the secure area 137 and decodes the obtained biometric data by using the unique key while authenticating biometric identification. The security processor 326 transmits the decoded biometric data to the data matcher 324. In certain embodiments, a function for generating a unique key is used while operating in a virtual security core system, but is restricted to access while operating in a general compensation core system. According to certain embodiments of the present disclosure, the security processor 326 encrypts the biometric data by using a unique key and transmits the encrypted biometric data to a biometric identification function control module (for example, virtual general core 111 of FIG. 1B) in the general area. The security processor 326 receives the encrypted biometric data from the biometric identification function control module in the general area when a live object is identified and decodes the encrypted biometric data by using a unique key generated in a security mode. The security processor 326 transmits the decoded biometric data to the data matcher 324. According to certain embodiments of the present disclosure, the security processor 326 generates pseudo data by transforming biometric data by using a transform function. The transform function includes a one-way function, data arrangement function, or function utilizing a value obtainable from a security mode or separate security hardware. The transform function stores the biometric data as metadata. The security processor 326 transmits the generated pseudo data to the data matcher 324 and the data generator 322. For example, the dater generator 322 stores the pseudo data as registration information. The data matcher 322 decides success in biometric authentication by comparing the registered pseudo data and newly generated pseudo data.

The security processor 326 differently utilizes the transform function for generating pseudo data. For example, when biometric identification information is unintentionally exposed to the outside, the security processor 326 modifies the transform function and generates new pseudo data by using the modified transform function. The metadata of biometric data is also renewed if the biometric data is exposed to the outside, and thereby the security processor 326 revises or discards the existing biometric data. According to various embodiments of the present disclosure, in an electronic device 300 operating with a general area 135 and secure area 135 through one processor 320, the processor 320 is included so that an input event of biometric information is detected from a biometric sensor module for recognizing a body in a general area, the input event of biometric information in the general area is transmitted to a secure area 137, sensing data is obtained from a biometric sensor module responding to the input event of biometric information in the secure area 137, and result information of registering biometric information and biometric identification is transmitted to the general area by processing the sensing data obtained from the secure area 137. In the secure area 137, the processor 320 calculates specific information from the sensing data, generates biometric data based on the specific information, encrypts the biometric data by using a unique key generated based on inherent identification information, and registers the encrypted biometric data as biometric information. The processor 320 transmits the encrypted biometric data to the general area and stores the biometric data encrypted in the general area.

The processor 320 obtains encrypted registration data from a memory allocated by the secure area 137 or general area, decodes the encrypted registration data by using a unique key generated based on inherent identification information, performs biometric authentication by comparing the decoded registration data and generated biometric data, decides that the biometric authentication succeeded if a matching value of data is greater than a predetermined critical value according to the result of comparison, and decides that the biometric authentication failed if the matching value of data is less than the predetermined critical value. The processor 320 transmits a true or false signal corresponding to the result of registration or identification. The processor 320 generates pseudo data by transforming the biometric data through a transform function, encrypt the pseudo data, and store the encrypted pseudo data as biometric registration information. When authenticating biometric identification, the processor 320 performs biometric identification authentication based on the pseudo data. The processor 320 s modifies the transform function if the biometric information is exposed to the outside. The transform function uses a value provided by a security mode or separate security hardware. The memory 350 corresponds to the memory 230 of FIG. 2. The memory 350 includes authentication information DB 351, authentication information 352, and application 353. The application 353 corresponds to the application 134 of FIG. 1A. The authentication information DB 351 includes information combined with semi-permanent or permanent representative authentication information related to an account and temporary authentication information for an additional authenticating procedure. The account applied to various embodiments of the present disclosure is defined as follows. "Account" means a user ID and password assigned when a user become a member of internet service provider and PC communication service. "Representative authentication information" means an account including an ID and password. The authentication information 352 includes representative authentication information and temporary authentication information. The representative authentication includes a fingerprint and iris pattern as well as an account. The temporary authentication information includes facial identification, using a camera or a facial recognizing sensor, and peripheral device information identified through the wireless communication unit 310. The account is input when authentication is requested in an application 353 requiring personal information. Connection information, such as representative authentication information and temporary authentication information, is stored in the authentication information DB 351, and detailed description will be made referring to Table 1.

TABLE 1

Data list of authentication information DB

| No. | Account ID | Account PWD | Application information | Representative authentication information | Temporary authentication information |
| --- | --- | --- | --- | --- | --- |
| 1 | A1 | P1 | Google | Fingerprint 1 | Face 1 |
| 2 | A2 | P2 | Google | Fingerprint 2 | Watch 1 |
| 3 | A3 | P3 | Cloud application | Iris Pattern 1 | Side touch sensor |

Referring to Table 1, the processor 320 stores an account identification (ID) or information characterized by the account ID, account password (PWD) or information characterized by the account PWD, information of application 353, representative authentication information or information characterized by the representative authentication information, and temporary authentication information or information characterized by the temporary authentication information in the authentication information DB 351. The representative authentication information includes an account ID and account PWD. Table 1 illustrates three examples of not including the account ID and PWD according to various embodiments of the present disclosure. Referring to the first example of Table 1, the processor 320 stores representative authentication information and temporary authentication information of application 353 (such as GOOGLE® account information A1 and P1) as illustrated in Table 1. The representative authentication information of the GOOGLE® account is a first fingerprint and the temporary authentication information is a first face. User authentication is made with the first fingerprint through a fingerprint recognizing sensor of the sensor unit 330. The processor 320 recognizes a face by controlling a face recognizing sensor of the camera 340 or sensor unit 330 and stores the face as temporary authentication information. Subsequently, the processor 320 maintains an authentication state when the temporary authentication information identified by controlling the face recognizing sensor of the camera 340 or sensor unit 330 is identical to the first face stored in the authentication information DB 351. The authentication state is released when the temporary authentication information is not identical to the first face stored in the authentication information DB 351.

Referring to the second example of Table 1, the processor 320 stores representative authentication information and temporary authentication information of application 353 (such as GOOGLE® account information A2 and P2) by mapping as shown in Table 1. The representative authentication information of GOOGLE® account is a second fingerprint and the temporary authentication information is a first watch. The processor 320 performs user authentication by using the second fingerprint through the fingerprint recognizing sensor of the sensor unit 330 and stores the first watch as temporary authentication information by controlling the wireless communication unit 310. The processor 320 identifies whether the first watch is located within a predetermined distance by using a near-field communication of the wireless communication unit 310, such as a Bluetooth communication. When the first watch is identified to be located within the predetermined distance, the processor 320 maintains the authentication state. When the first watch is identified not to be located within the predetermined distance, the processor 320 releases the authentication state. Further, the processor 320 identifies whether the first watch is worn by a user by receiving information from a contact sensor integrated into the sensor unit 330 or from a peripheral device through the wireless communication unit. For example, a heart rate measuring sensor is integrated as the contact sensor. When the first watch is identified as not worn by the user, the processor 320 releases the user authentication. The processor 320 identifies the temporary authentication information with at least one of the distance and wearing state.

Referring to the third example of Table 1, the processor 320 stores representative authentication information and temporary authentication information of application 353 (such as account information A3 and P3 of a cloud application) by mapping as illustrated in Table 1. The representative authentication information of cloud application is a first iris pattern and the temporary authentication information is a side touch sensor. The processor 320 recognizes the first iris pattern through the sensor unit 330 and recognizes and stores the side touch sensor as temporary authentication information through the sensor unit 330. The processor 320 releases the user authentication when the side touch sensor is deactivated.

The apparatus for controlling an authentication state of an electronic device according to various embodiments of the present disclosure includes a display unit configured to display a screen requesting user authentication for a first application; a sensor unit, camera, and wireless communication unit configured to recognize temporary authentication information and representative authentication information; a memory configured to store information including at least one of the temporary authentication information and the first application, and an authentication information DB for storing information required to connect the representative authentication information; and a controller configured to authenticate user login with representative authentication information in a first application requiring user authentication, to identify temporary authentication information when authenticating the user in the first application, to store the identified temporary authentication information and the representative authentication information, to decide whether temporary authentication information is identical to the stored temporary authentication information by identifying the temporary authentication information while using the first application, and to maintain an authentication state if the temporary authentication is identical to the stored temporary authentication information.

Figure 4:
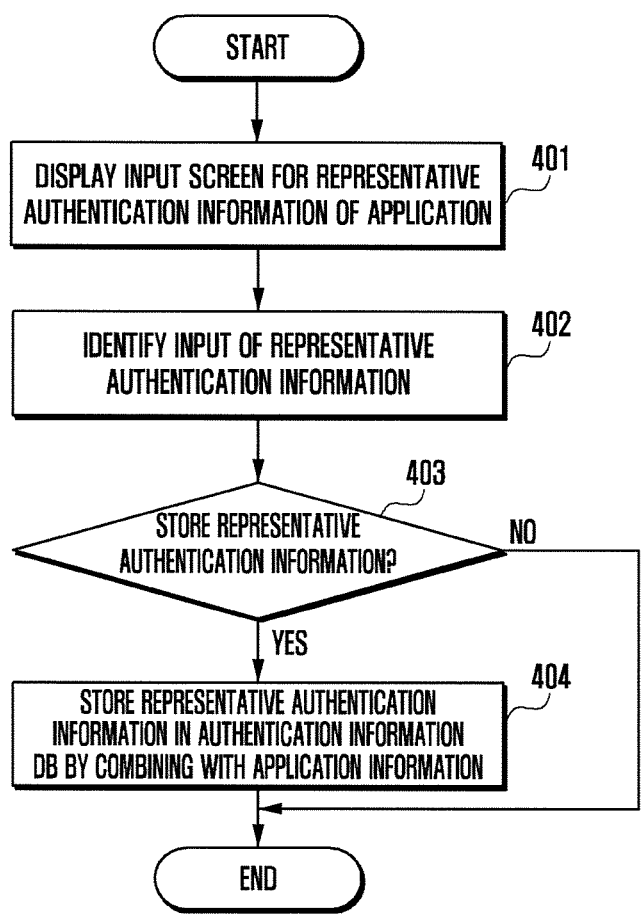
FIG. 4 illustrates an exemplary process of storing representative authentication information and temporary authentication information in a memory for an account according to various embodiments of the present disclosure.

FIG. 4 illustrates an exemplary process of storing representative authentication information and temporary authentication information in a memory for an account according to various embodiments of the present disclosure.

Hereinafter, the representative authentication information includes account information described differently from Table 1. A method of requesting for representative authentication information is described with an application, but the method is not limited to the application and can be performed through a browser or website application.

In step 401, the processor 320 controls the display unit 360 to display an input screen for representative authentication information of the application 353 at operation 401. In step 402, the processor 320 identifies representative authentication information of the application 353 input by a user. In step 403, the processor 320 decides whether to store the representative authentication information according to the user's selection. In step 404, when storing is selected by the user, the processor 320 stores the representative authentication information in the authentication information DB 351 by combining with application information.

Figure 5B:
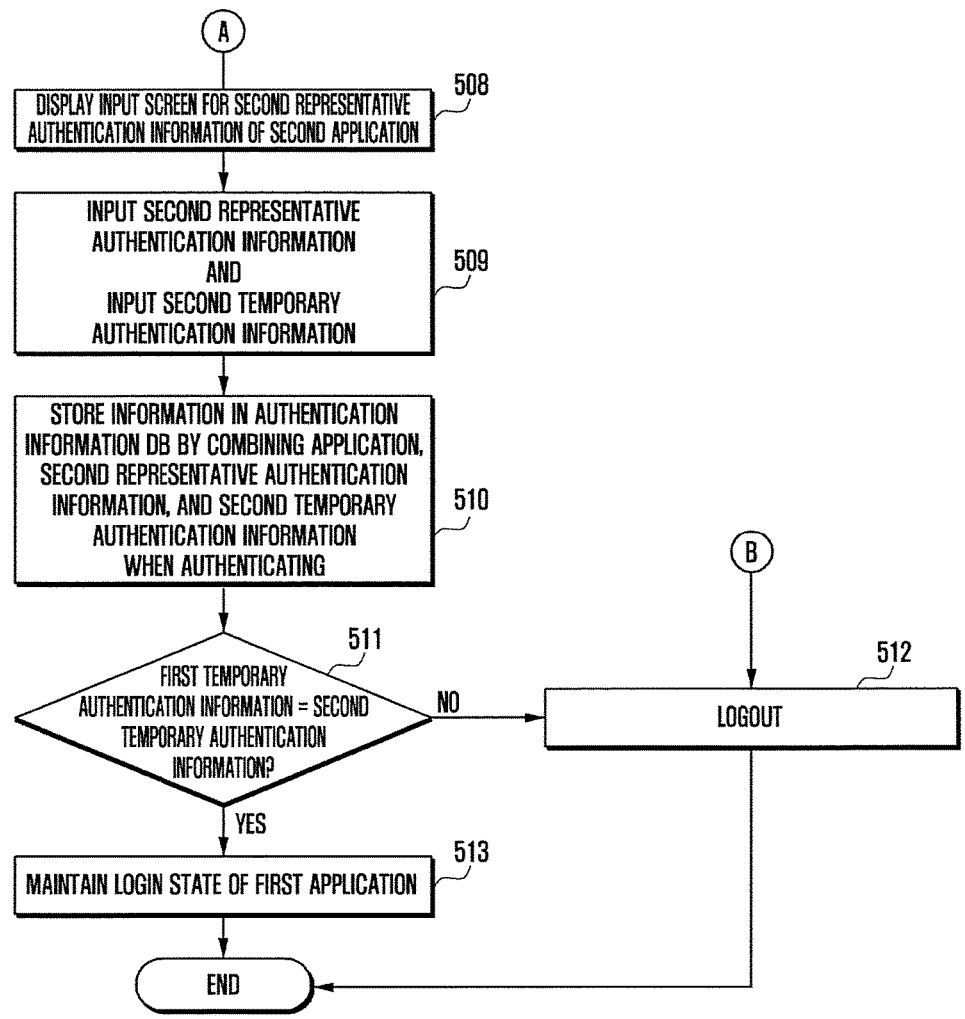

FIGS. 5A and 5B illustrate exemplary processes of controlling an authentication state according to certain embodiments of the present disclosure.

In step 501, the processor 320 controls the display unit 360 to display an input screen for representative authentication information of the application 353. In step 502, the processor 320 identifies first representative authentication information and first temporary authentication information input by a user. In step 503, while performing the authentication, the processor 320 stores information which connects the application 353, first representative authentication information, and first temporary authentication information in the authentication information DB 351. In step 504, while executing the application 353, the processor 320 identifies the temporary authentication information. In step 505, the processor 320 identifies whether the identified temporary authentication information is identical to temporary authentication information stored in the authentication information DB 351 by connecting to the first representative authentication information. In step 506, when the identified temporary authentication information is identical, the processor 320 maintains the authentication state.

In step 507, the processor 320 identifies whether execution of a second application is requested. When execution of a second application is not requested, the processor 320 returns to step 504 and identifies the temporary authentication information again. The processor 320 identifies the temporary authentication information when an execution time of at least one of an application or browser elapsed a predetermined time or an additional authentication is required.

In step 508, when a request for executing the second application is identified at step 507, the processor 320 controls the display unit 360 to display an input screen for a second representative authentication information of the second application at operation 508. In step 509, the processor 320 identifies whether second representative authentication information and second temporary authentication information for logging into the second application are input by a user. In step 510, when authenticating user login, the processor 320 stores the information which connects the second application, the second representative authentication information, and the second temporary authentication information in the authentication information DB 351. In step 511, the processor 320 identifies whether the second temporary authentication information is identical to the first temporary authentication information. In step 512, when the identified temporary authentication information or the second temporary authentication is not identical, the processor 320 releases a login state. In step 513, when the second temporary authentication is identical, the processor 320 maintains the login state.

Figure 6:
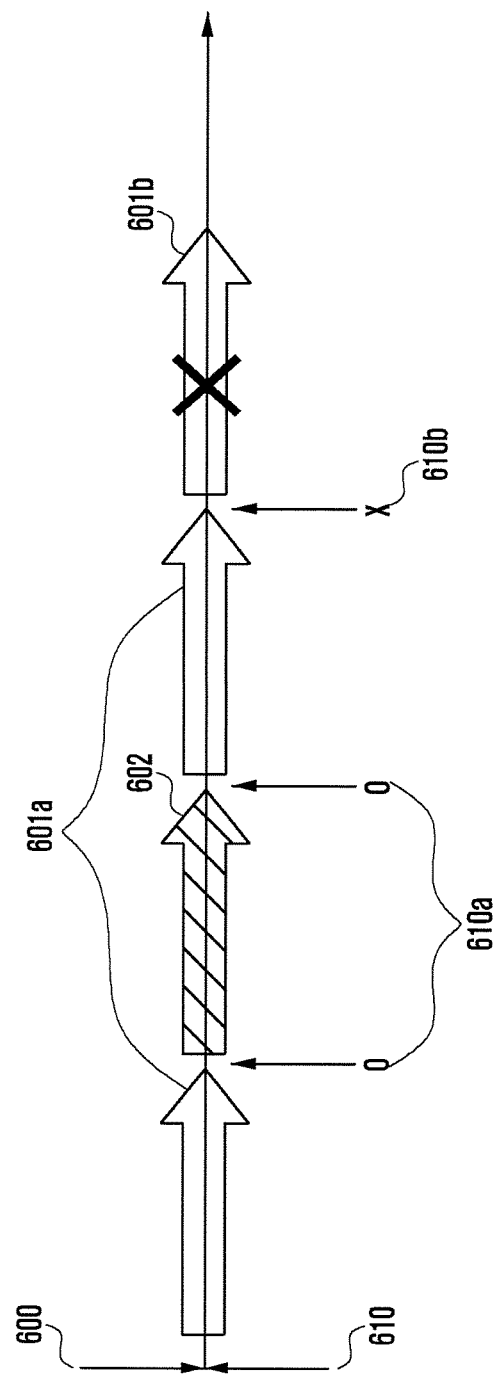
FIG. 6 illustrates an exemplary process of controlling an authentication state according to various embodiments of the present disclosure.

FIG. 6 illustrates an exemplary process of controlling an authentication state according to certain embodiments of the present disclosure.

Referring to FIG. 6, the processor 320 controls the display unit 360 to display an input screen for a first application 601a. The processor 320 then identifies whether first representative authentication information 600 is input by a user. While authenticating the user login, the processor 320 stores information which connects the first application 601a, a first representative authentication information 600, and a first temporary authentication information in the authentication information DB 351. After authenticating, the user logs into the first application 601a. Namely, the processor 320 controls the display unit 360 to display information of the first application for the user. At the same time of logging into the first application or after a predetermined time interval, the processor 320 identifies a temporary authentication information 610. The processor 320 identifies whether the identified temporary authentication information is identical to first temporary authentication information stored in the authentication information DB 351 by connecting to first representative authentication information. The processor 320 makes a request for identifying the temporary authentication information after terminating the first application 601a, when execution of second application 602 is requested or after the execution time of the first application elapsed a predetermined time. As shown in FIG. 6, the processor 320 makes a request for temporary authentication information when the execution of the second application 602 is requested. When the representative authentication information input for the second application 602 is first representative authentication information, the processor 320 identifies whether temporary authentication information is identical to first temporary authentication information stored in the authentication information DB 351 by connecting to the first authentication information.

When the temporary authentication information 610a is identified to be identical to the first representative authentication information, the processor 320 controls the display unit 360 to display information of the second application 602. When an input for the first representative authentication information is identified corresponding to a request for executing the first application 610a, the processor 320 performs a procedure of temporary authentication. When the identified temporary authentication information 610a is identified to be identical to the first temporary authentication information, the processor 320 controls the display unit 360 to display information of the first application 601a. When the processor 320 makes a request for identifying temporary authentication information after the execution time of the first application 601a elapsed a predetermined time. When the first temporary authentication information 610 is not identical to the temporary authentication information 610b, the processor 320 releases a login state of the first application 601a. The processor 320 then cannot log into the first application 601b until temporary authentication information 610b becomes identical to the first temporary authentication information 610.

Figure 7:
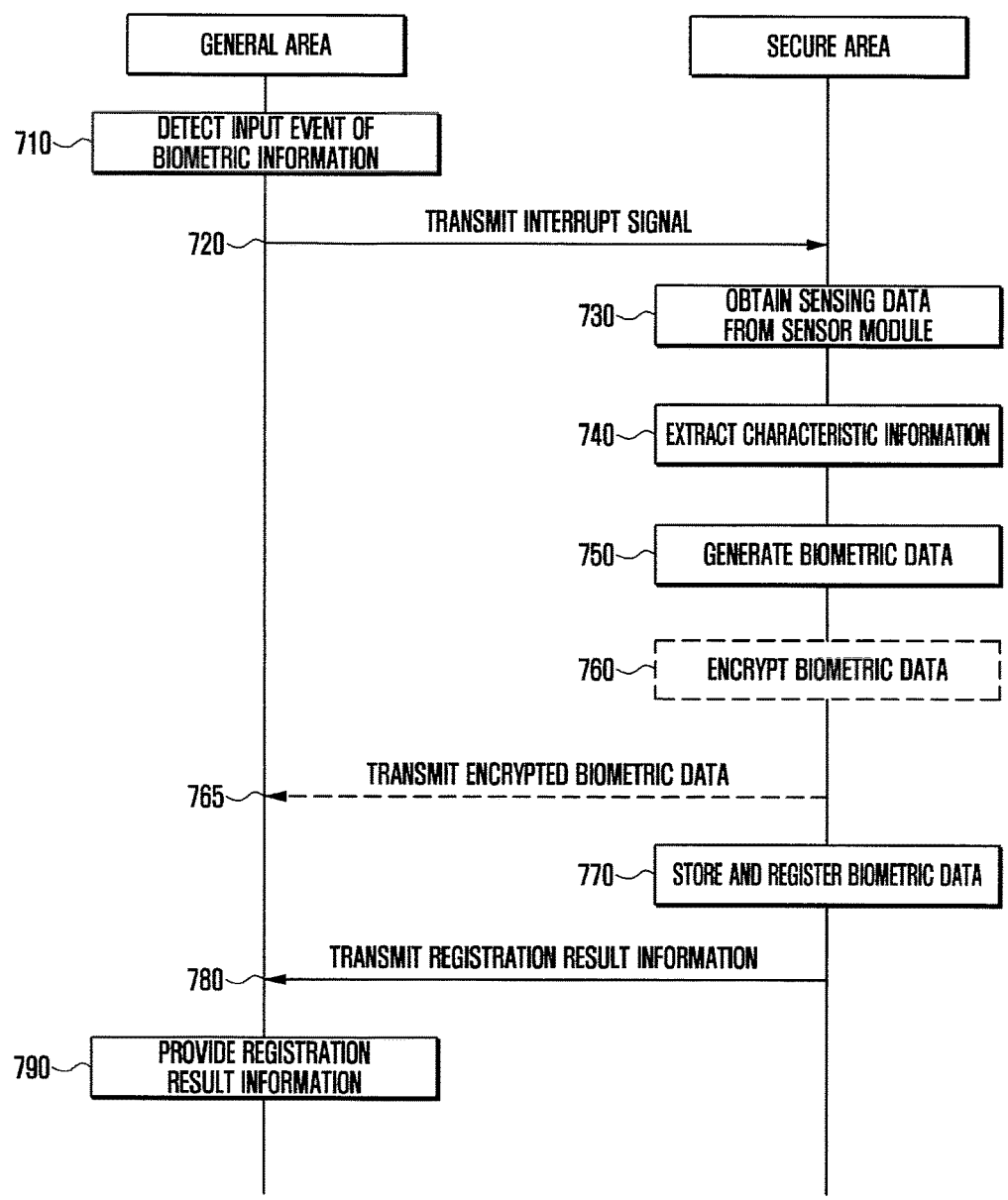
FIG. 7 illustrates an exemplary process for registering biometric authentication information of an electronic device according to various embodiments of the present disclosure.

FIG. 7 illustrates an exemplary process for registering biometric authentication information of an electronic device according to certain embodiments of the present disclosure.

In step 710, the processor 320 detects an input event of biometric information based on an interrupt signal transmitted from the biometric sensor module 180 in the general area 135 for registering biometric information, for example, in a registration mode. When a function for registering biometric information is generated in the general area 135, the processor 320 activates the biometric sensor module 180 and detects an object through the biometric sensor module 180. For example, the processor 320 identifies a user's finger touch by using a fingerprint sensor. The processor 320 identifies a user's eye by using an iris sensor. The processor 320 identifies a user's hand approaching to a sensor by using a vein sensor. The processor 320 identifies a user's voice by using a voice sensor. The processor 320 identifies a user's face by using a face recognizing sensor.

In step 720 when an input event of biometric information is detected, the processor 320 transmits an event detection signal to the secure area 137 in order to call a virtual security core system. In certain embodiments, the event detection signal is a security interrupt signal.

In step 730, the processor 320 obtains sensing data from the biometric sensor module 180 in the secure area 137. The sensing data is raw data of the biometric information. For example, the sensing data includes at least one of a user's fingerprint, lines of a palm, retina pattern, iris pattern, blood vessel pattern, ear shape, face shape, user's voice, and handwriting sample.

In step 740, the processor 320 calculates inherent characteristic information of identified object in the secure area 137 based on the sensing data. For example, the processor 320 obtains a sensing image from the sensing data and extracts specific information from the sensing image.

In step 750, the processor 320 generates biometric data in the secure area 137 by transforming the specific information to a template form.

In step 760, the processor 320 encrypts the biometric data in the secure area 137. For example, the processor 320 generates a unique key in the secure area 137 based on inherent identification information of a device. The unique key is a value accessible in a security mode. For example, the processor 320 stores function information for generating a unique key in a memory allocated by the secure area 137 and generates a unique key through the function information in the security mode. Step 760 can be omitted; however the present disclosure is not limited to this.

In step 765, the processor 320 transmits the biometric data encrypted in the secure area 137 to the general area 135. For example, the processor 320 stores the encrypted biometric data in a memory allocated by the general area 135, for example, an REE file system.

In step 770, the processor 320 stores and registers biometric data or encrypted biometric data in the secure area 137 as registration data for biometric identification. According to certain embodiments of the present disclosure, processor 320 stores and registers the biometric data in the secure area 137 accessible in a security mode. According to certain embodiments of the present disclosure, the processor 320 stores a unique key used for encryption or function information for generating a unique key in the secure area 137 accessible in a security mode, and transmit encrypted biometric data to the general area 135. The processor 320 stores and registers the encrypted biometric data, which is transmitted from the secure area 137, in the general area 135 having no access limitation.

In step 780, the processor 320 transmits the result of biometric registration from the secure area 137 to the general area 135. In step 790, the processor 320 provides a user with registration information of biometric information, which is registered in the general area 135 by a virtual general core, through a user interface or a component of the electronic device 300.

When the registration of biometric information fails due to a low quality of raw data, the processor 320 performs the procedure of registration again. The processor 320 provides at least one of a feedback for the failure of registration, for example, by using a visual or acoustic effect, and new sensing data through a user interface in the general area 135.

Figure 8:
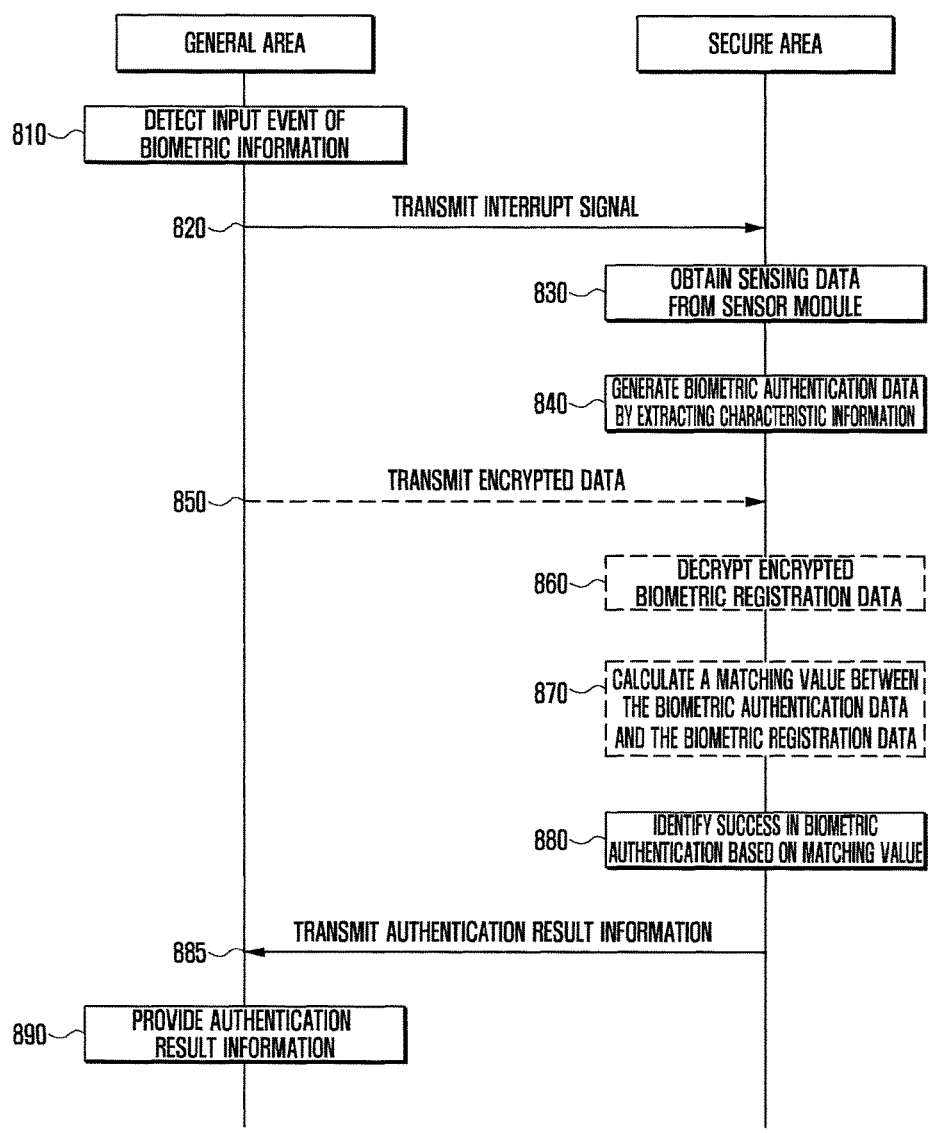
FIG. 8 illustrates an exemplary process for authenticating biometric information of an electronic device according to various embodiments of the present disclosure.

FIG. 8 illustrates an exemplary process for authenticating biometric information of an electronic device according to certain embodiments of the present disclosure.

In step 810, for biometric authentication (for example, in an authentication mode), the processor 320 detects an input event for biometric information based on an interrupt signal transmitted from the general area 135 to the biometric sensor module. When a function for biometric authentication is requested in the general area 135, the processor 320 activates the biometric sensor module 180 and detects an object through the biometric sensor module 180.

In step 820, when an input event for biometric information is detected in the general area 135, the processor 320 transmits an event detection signal to the secure area 137. In certain embodiments, the event detection signal is a security interrupt signal.

In step 830, the processor 320 obtains sensing data from the biometric sensor module 180 in the secure area 137. In step 840, the processor 320 calculates inherent characteristic information based on the sensing data obtained in the secure area 137 and generates biometric authentication information. In certain embodiments, the biometric authentication data includes a predetermined format such as a template form.

In step 850, the processor 320 receives encrypted biometric registration data in the secure area 137 from the general area 135 or obtains the encrypted biometric registration data from a memory allocated in the secure area 137. In step 860, the processor 320 decodes biometric registration data (for example, encrypted biometric data) stored in the secure area 137. For example, when the encrypted biometric data is obtained from the secure area 137, the processor 320 decodes the encrypted biometric data using a unique key. The processor 320 obtains function information for generating a unique key from a memory allocated by the secure area 137 having an access limitation and generates the unique key by using the obtained function information.

In step 870, the processor 320 calculates a matching value by comparing characteristic information of biometric authentication data and biometric registration data in the security area 137. In step 880, the processor 320 decides the success in the biometric authentication based on the matching value of specific information in the secure area 137. For example, when the matching value exceeds a predetermined critical value, the processor 320 decides that the biometric authentication succeeded. When the matching value is less than the predetermined critical value, the processor 320 decides that the biometric authentication failed.

In step 885, the processor 320 transmits the result of biometric authentication from the secure area 137 to the general area 135. In step 890, in the general area 135, the processor 320 provides a user with the result of biometric authentication through a user interface or a component of the electronic device 300.

When the identification of biometric information failed due to a low quality of raw data, the processor 320 performs the procedure of identification again and provides the user with at least one of a feedback for the failure of identification (for example, by using a visual, acoustic, tactile, or olfactory effect) and obtainment of new sensing data through a user interface in the general area 135.

The method for controlling an authentication state of an electronic device according to various embodiment of the present disclosure includes authenticating user login with representative authentication information in a first application requiring user authentication, identifying temporary authentication information when authenticating the user in the first application, storing the identified temporary authentication information and the representative authentication information, deciding whether temporary authentication information is identical to the stored temporary authentication information by identifying the temporary authentication information while using the first application, and maintaining an authentication state if the temporary authentication is identical to the stored temporary authentication information.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present disclosure.

The module or programming module of the present disclosure can include at least one of the aforementioned components with omission of some components or addition of other components. The operations of the modules, programming modules, or other components can be executed in series, in parallel, recursively, or heuristically. Also, some operations can be executed in different order, omitted, or extended with other operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling an authentication state of applications of an electronic device, the method comprising:
   receiving, by a processor of the electronic device, representative authentication information for a first authentication associated with a first application;
   receiving, by the processor, a first temporary authentication information when performing the first authentication associated with the first application;
   storing, by the processor, the first temporary authentication information and the representative authentication information in a memory of the electronic device in association with the first application;
   receiving, by the processor, a second temporary authentication information during execution of the first application;
   determining, by the processor, whether to maintain the authentication state of the first application based on a result of comparing the first temporary authentication information and the second temporary authentication information;
   receiving, by the processor, a third temporary authentication information when performing a second authentication associated with a second application; and
   determining, by the processor, whether to maintain the authentication state of the first application based on a result of comparing the first temporary authentication information and the third temporary authentication information.

2. The method of claim 1, wherein receiving the representative authentication information comprises receiving the representative authentication information including at least one of user's body information and account information.

3. The method of claim 1, wherein receiving the first temporary authentication information comprises receiving at least one of communication information associated with at least one of external electronic devices and identification information obtained by a camera.

4. The method of claim 1, wherein receiving the second temporary authentication information comprises receiving the second temporary authentication information when an execution time of the first application exceeds a predetermined time.

5. The method of claim 1, wherein receiving the second temporary authentication information comprises receiving the second temporary authentication information when a second application requiring user authentication is executed.

6. The method of claim 1, wherein receiving the third temporary authentication information comprises receiving the third temporary authentication information if the representative authentication information is received when the second application requiring user authentication is to be executed.

7. The method of claim 1, further comprising:
storing the third temporary authentication information in the memory by using the representative authentication information.

8. The method of claim 7, wherein receiving the third temporary authentication information comprises receiving the representative authentication information including at least one of user's body information and account information.

9. The method of claim 7, wherein receiving a third temporary authentication information comprises receiving at least one of communication information associated with at least one of external electronic devices and identification information obtained by a camera.

10. The method of claim 1, further comprising, when at least one of the second temporary authentication information or the third temporary authentication information is not identical to the first temporary authentication information, release the authentication state of the first application.

11. An apparatus for controlling an authentication state of application of an electronic device, the apparatus comprising:
a display unit;
a sensor unit;
a camera;
a wireless communication unit;
a memory; and
a controller configured to:
receive representative authentication information for a first authentication associated with a first application,
receive a first temporary authentication information when performing the first authentication associated with the first application,
store the first temporary authentication information and the representative authentication information in the memory in association with the first application,
receive a second temporary authentication information during execution of the first application;
determine whether to maintain the authentication state of the first application based on a result of comparing the first temporary authentication information and the second temporary authentication information;
receive a third temporary authentication information when performing a second authentication associated with a second application; and
determine whether to maintain the authentication state the first application based on a result of comparing the first temporary authentication information and the third temporary authentication information.

12. The apparatus of claim 11, wherein the controller is further configured to receive the representative authentication information including at least one of user's body information and account information.

13. The apparatus of claim 11, wherein the controller is further configured to receive the first temporary authentication information by receiving at least one of communication information associated with at least one of external electronic devices and identification information obtained by the camera.

14. The apparatus of claim 11, wherein the controller is further configured to receive the second temporary authentication information when an execution time of the first application exceeds a predetermined time.

15. The apparatus of claim 11, wherein the controller is further configured to receive the second temporary authentication information when a second application requiring user authentication is executed.

16. The apparatus of claim 11, wherein the controller is further configured to receive the third temporary authentication information if the representative authentication information is received when the second application requiring user authentication is to be executed.

17. The apparatus of claim 11, wherein the controller is further configured to:
store the third temporary authentication information in the memory by using the representative authentication information.

18. The apparatus of claim 11, wherein the controller is further configured to perform the second authentication with the representative authentication information including at least one of user's body information and account information.

19. The apparatus of claim 11, wherein the controller is further configured to receive the third temporary authentication information by receiving at least one of communication information associated with at least one of external electronic devices received by the wireless communication unit and identification information obtained by the camera.

20. The apparatus of claim 11, wherein the controller is further configured to, when at least one of the second temporary authentication information or the third temporary authentication information is not identical to the first temporary authentication information, release the authentication state of the first application.

* * * * *